3,267,558
BALL VALVE SEALS
Ian M. Wilson, Halliwell, Bolton, England, assignor to Henry Crossley (Packings) Limited, Bolton, England, a British company
Filed Sept. 25, 1963, Ser. No. 311,353
Claims priority, application Great Britain, Oct. 17, 1962, 39,331/62
1 Claim. (Cl. 29—156.7)

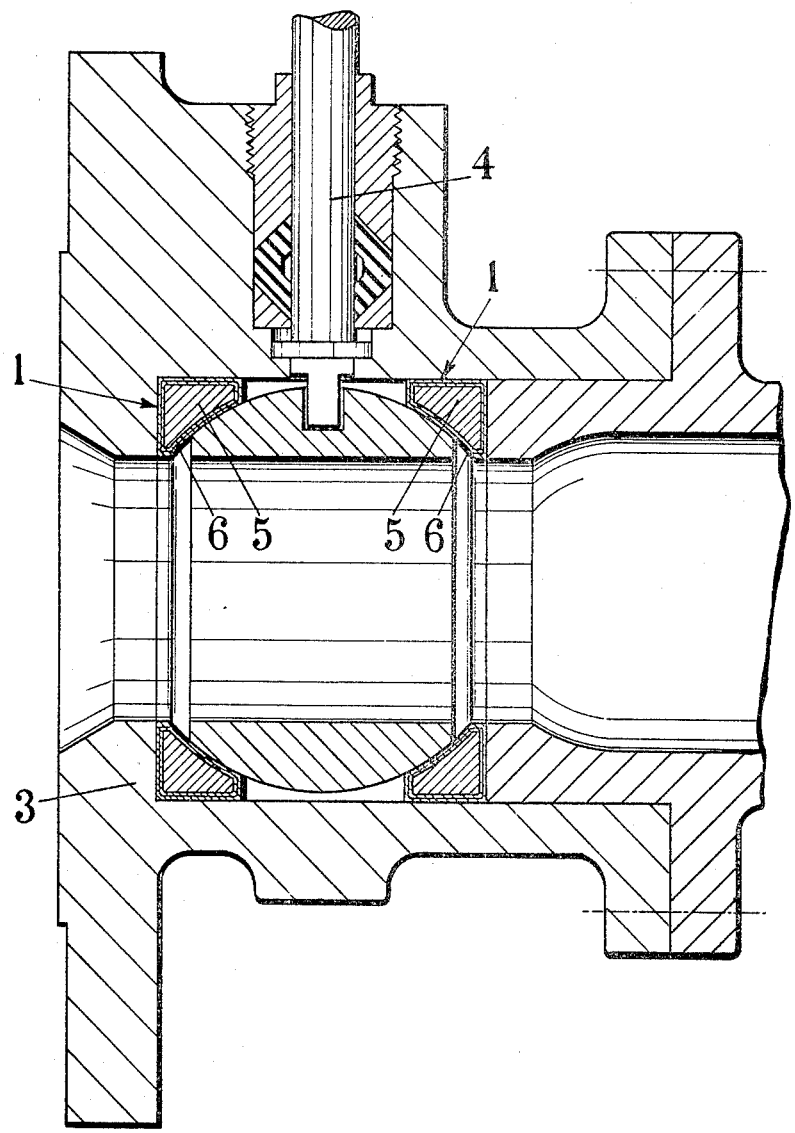

This invention relates to ball valve seals. It is well known to use ball valve seals made from solid fully sintered granular polymer P.T.F.E. because of the following properties of this material. The material is almost chemically inert, is virtually self lubricating and has remarkable non-stick properties.

The main limiting factors in the use of P.T.F.E. as a ball valve seal are: (1) In certain applications such as are encountered in the petroleum industries, it has been found that in the event of the working temperature rising above 400° C. the P.T.F.E. disintegrates, causing the valve to leak and this temperature could be reached in the event of fire. (2) In certain applications where very cold temperatures are involved such as is encountered in the handling of liquid oxygen, nitrogen, helium and the like, the coefficient of contraction of the P.T.F.E. is so great that the dimensional reductions are such that leakage at the seals can occur.

The object of the present invention is to provide an improved ball valve seal. In accordance with our invention, the ball valve seal is produced from metal e.g. aluminium, steel, brass, in a form, shape or configuration, identical to the final requirement except that all dimensions are reduced a controlled amount, e.g. .020″ smaller in all dimensions. Dependent on the size or application, this metal seal can be either a solid one piece component or two half seals hollow in section. With the hollow section, the reaction to deflection due to assembly loads would give rise to a tighter degree of sealing in the final seal form.

The metal ball valve seal is then enveloped in a sufficient wrapping of unsintered P.T.F.E. tape to build the seal up to the required finished dimensions. The wrapped seal is heated in an oven to the sintering temperature of P.T.F.E. The wrapped seal is removed from the oven and placed in a die which is the exact size and shape of the finished seal to be produced. This die is so constructed, that when the two male components reach a stop, the correct desired pressure has been applied to the P.T.F.E. wrapping. Under this pressure the seal is allowed to cool.

Applying pressure in the manner indicated immediately after the wrapped seal is removed from the sintering oven, ensures that the P.T.F.E. tape wrappings will bond together to form an impermeable cover for the seal metal core.

The above method of construction ensures that the ball valve seal retains the chemical inert, self lubricating and non-stick properties such as would be possessed by a seal manufactured from solid P.T.F.E. The improved seal has the following additional advantages: (1) That in the event of disintegration of the covering occurring at elevated temperatures, the metal core will effect an efficient seal due to the fluid force acting on the ball forcing it against the outlet side of the valve until such time as it comes in contact with the metal core of the improved seal, which it is generally reckoned will stand up to this severe application e.g. fire, without leakage long enough for remedial action to be taken. (2) When the improved seal is incorporated in system handling very cold fluids, limiting the quantity of P.T.F.E. in the seal make-up ensures that reduction in dimensions due to contraction is controlled, such that leakage is not likely to occur. (3) The use of two piece hollow section cores for large diameter seals ensures that effective sealing can be achieved with much lighter assembly loading.

The accompanying drawing shows a sectional view of a ball valve incorporating seals in accordance with the invention.

The ball valve comprises two seals 1 which bear on a ball 2 mounted in a valve body 3. The ball 2 has a stem 4 by means of which it is turned through 90° from the open position shown in the drawing to the closed position.

According to the invention, each seal consists of a metal core 5 surrounded by a wrapping 6 of P.T.F.E. tape.

What is claimed is:

A method for making a seal for ball valves comprising the steps of producing a metal core having a configuration identical to final requirements with all dimensions reduced by a controlled amount, enveloping the metal core in a wrapping of unsintered P.T.F.E. to effect the required final dimensions, heating the enveloped metal core to the sintering temperature of the P.T.F.E. and immediately thereafter positioning the enveloped metal core in a die wherein the desired pressure is applied to the wrapping and allowing the enveloped core to cool.

References Cited by the Examiner
UNITED STATES PATENTS

| | | | |
|---|---|---|---|
| 2,456,262 | 12/1948 | Fields | 264—127 X |
| 2,689,380 | 9/1954 | Tait | 264—127 X |
| 2,941,911 | 6/1960 | Kumnick et al. | 264—127 X |
| 3,118,649 | 1/1964 | Allen | 251—315 X |
| 3,173,648 | 3/1965 | McGuire | 251—315 X |

M. CARY NELSON, *Primary Examiner.*

A. JAFFE, E. FEIN, *Assistant Examiners.*